(12) United States Patent
Hanyu et al.

(10) Patent No.: US 6,685,591 B2
(45) Date of Patent: Feb. 3, 2004

(54) DRIVING APPARATUS FOR A VEHICLE

(75) Inventors: Tomoyuki Hanyu, Hitachi (JP);
Masahiko Amano, Hitachiohta (JP);
Masahiko Ibamoto, Hitachinaka (JP);
Toshimichi Minowa, Mito (JP); Yasuo Morooka, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 133 days.

(21) Appl. No.: 09/942,683

(22) Filed: Aug. 31, 2001

(65) Prior Publication Data
US 2002/0123407 A1 Sep. 5, 2002

(30) Foreign Application Priority Data
Mar. 1, 2001 (JP) ........................................ 2001-056949

(51) Int. Cl.$^7$ ................................................. F16H 3/72
(52) U.S. Cl. ................. 475/5; 477/3; 477/5; 180/65.2; 180/65.7
(58) Field of Search ............................. 475/5; 477/3, 5; 180/65.2, 65.7

(56) References Cited

U.S. PATENT DOCUMENTS

| 5,643,199 | A | | 7/1997 | Rowland et al. | |
|---|---|---|---|---|---|
| 5,713,425 | A | * | 2/1998 | Buschhaus et al. | 180/297 |
| 5,775,449 | A | | 7/1998 | Moroto et al. | |
| 6,019,698 | A | * | 2/2000 | Lawrie et al. | 477/3 |
| 6,053,833 | A | * | 4/2000 | Masaki | 475/2 |
| 6,299,563 | B1 | * | 10/2001 | Shimasaki | 477/3 |

FOREIGN PATENT DOCUMENTS

| JP | 10-217779 | 8/1998 |
|---|---|---|
| JP | 2000-225862 | 8/2000 |

* cited by examiner

Primary Examiner—Rodney H. Bonck
Assistant Examiner—Dennis Abdelnour
(74) Attorney, Agent, or Firm—Dickstein Shapiro Morin & Oshinsky LLP

(57) ABSTRACT

The present invention provides a driving apparatus for a vehicle comprising an engine for providing a primary driving force to a driving shaft and an auxiliary power plant connected with the engine through a transmission the transmission comprising an input shaft for inputting the primary driving force from the engine and an output shaft connected to the input shaft for transmitting the primary driving force to the driving shaft wherein the auxiliary power plant provides a secondary driving force to the driving shaft during a shifting in speed.

16 Claims, 15 Drawing Sheets

DRIVING APPARATUS FOR A VEHICLE

FIELD OF THE INVENTION

The present invention relates to a driving apparatus for a vehicle comprising an internal combustion engine, an auxiliary power plant and a differential mechanism and a vehicle using the same.

DISCUSSION OF THE RELATED ART

An automobile transmission includes a synchronous type using a meshing gear as in a manually-operated transmission and a planet type using a planetary gear as in an automatic transmission. The synchronous type is necessary to temporarily interrupt the transmission of an engine driving force when changing speed due to the characteristics of the meshing gear. Therefore, a torque shortage occurs caused by interruption of a driving force. Conventionally, for controlling this torque shortage, an auxiliary power plant (or motor generator "M/G") is utilized to compensate for the interruption of the driving force. But, since the torque interruption is compensated for by the M/G, the sum total of the output of the M/G that is required is equal to that of the engine, making it difficult to realize the loading properties of the system without having a costly and large M/G. Further, since the M/G arranged within the transmission has a gear ratio that is always higher than the engine speed, the cooperation loss increases when running at high speeds.

The plant type, utilizing a planetary gear, connects a first power transmission channel for transmitting an output of an engine to a vehicle driving shaft to a second power transmission channel in order to avoid a cooperation loss caused by a generator when the engine is stopped and the vehicle runs only by the motor. A power transmission switching means switches between the first and second power transmission channels. But, when the power transmission channels are switched during speed changes a shock occurs because of a torque difference between the power transmission channels.

SUMMARY OF THE INVENTION

The present invention provides a light-weight and compact driving apparatus for a vehicle and a vehicle using the same utilizing a planetary gear. The present invention also provides a driving apparatus which reduces shock caused by a torque difference between power transmission channels when changing speed.

In an object of the present invention a driving apparatus for a vehicle is provided comprising an engine for providing a primary driving force to a driving shaft and an auxiliary power plant connected with the engine through a transmission the transmission comprising an input shaft for inputting the primary driving force from the engine and an output shaft connected to the input shaft for transmitting the primary driving force to the driving shaft wherein the auxiliary power plant provides a secondary driving force to the driving shaft during a shifting in speed.

In another object of the present invention a driving apparatus for a vehicle is provided comprising an engine for providing a primary driving force to a driving shaft and an auxiliary power plant connected with the engine through a transmission the transmission comprising an input shaft for inputting the primary driving force from the engine and an output shaft connected to the input shaft for transmitting the primary driving force to the driving shaft wherein the auxiliary power plant provides a secondary driving force to the driving shaft during a shifting in speed the secondary driving force having a torque substantially equal to that of the primary driving force.

In yet another object of the present invention a driving apparatus for a vehicle is provided comprising an engine for providing a primary driving force to a driving shaft and an auxiliary power plant connected with the engine through a transmission the transmission comprising a set of gears for changing speed and an input shaft for inputting the primary driving force from the engine and an output shaft connected to the input shaft for transmitting the primary driving force to the driving shaft wherein the auxiliary power plant provides a secondary driving force to the driving shaft during a shifting in the gears.

In another object of the present invention a vehicle is provided utilizing the driving apparatus of the present invention. Also, a method of operating a driving apparatus of the present invention is provided.

BRIEF DESCRIPTION OF THE DRAWINGS

The above advantages and features of the invention will be more clearly understood from the following detailed description which is provided in connection with the accompanying drawings.

DETAILED DESCRIPTION OF THE INVENTION

Figure 1:
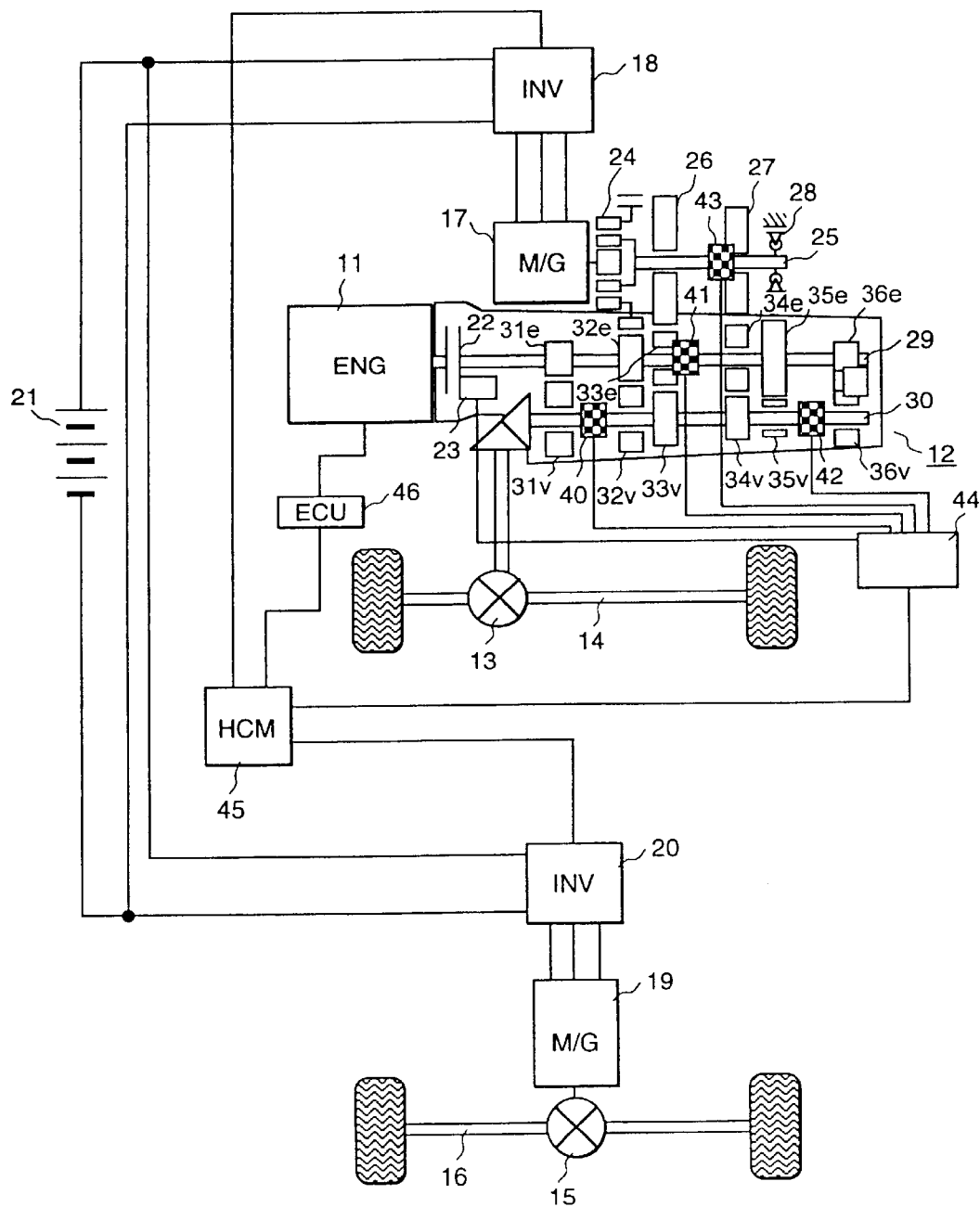
FIG. 1 illustrates a hybrid vehicle utilizing the driving apparatus according to one embodiment of the present invention.

Exemplary embodiment of the present invention will be described below in connection with the drawings. Other embodiments may be utilized and structural or logical changes may be made without departing from the spirit or scope of the present invention. Like items are referred to by like reference numerals throughout the drawings.

Referring now to the drawings, in FIG. 1, an engine 11 is an internal combustion engine, in which fuel and air are supplied to generate power. A transmission 12 is a mechanism for changing a driving force of the engine 11 according to the vehicle conditions. The driving force of the engine 11 through the transmission 12 is transmitted to a front wheel driving shaft 14 through a differential gear 13. The vehicle is provided on the rear wheel with a differential gear 15 and a rear wheel driving shaft 16.

An auxiliary power plant including a motor generator (M/G) is an electric motor which receives a supply of electric power from the outside to generate power, or receives a supply of power from the outside to generate electric power. M/G 17 is controlled for a driving force and power generation by a motor controller 18 such as an inverter. Likewise, M/G 19 is controlled for a driving force and power generation by a motor controller 20 such as an inverter. A battery 21 serves to store power to be output by the M/G 17 and the M/G 19. A clutch 22 is a mechanism for transmitting the driving force of the engine 11 to the driving shaft or interrupting the same. A clutch actuator 23 is a device for controlling engagement and disengagement of the clutch 22.

A planetary gear 24 comprises three input/output shafts, a sun gear, a carrier and a ring gear, out of which the sun gear is connected to the M/G 17, the carrier is connected to a planetary gear output shaft 25, and the ring gear is meshed with a gear of the transmission 12. In this case, the planetary gear 24 is meshed with a 2-speed input gear 32e. On the planetary gear output shaft 25 are arranged a low speed gear 26 and a high speed gear 27. A one-way clutch 28 is a mechanism for limiting a rotating direction of the planetary gear output shaft 25, which is actuated at the time of torque assisting by the M/G 17 or starting of the engine 11.

The transmission 12 has an input shaft 29 connected to the engine 11 through the clutch 22 and an output shaft 30 connected to the front wheel driving shaft 14 through the differential gear 13. The input shaft 29 and the output shaft 30 are connected to each other with a speed change gear of forward 5-speed and backward 1-speed comprising paired spur gears. The transmission 12 has the constitution similar to that of the conventional manually-operated transmission. Note, although the 5-speed is selected, any number of speeds may be selected.

A 1-speed input gear 31e of the transmission 12 is meshed with a 1-speed output gear 31v. Likewise, a 2-speed input gear 32e, a 3-speed input gear 33e, a 4-speed input gear 34e, a 5-speed input gear 35e, and a backward input gear 36e are meshed with a 2-speed output gear 32v, a 3-speed output gear 33v, a 4-speed output gear 34v, a 5-speed output gear 35v, and a backward output gear 36v, respectively. Here, the 1-speed input gear 31e, the 2-speed input gear 32e, the 5-speed input gear 35e, and the backward input gear 36e are connected to the input shaft 29. The 3-speed output gear 33v and the 4-speed output gear 34v are connected to the output shaft 30. The 1-speed output gear 31v, the 2-speed output gear 32v, the 5-speed output gear 35v and the backward output gear 36v are hollow gears and are rotatable on the output shaft 30. Further, the 3-speed input gear 33e and the 4-speed input gear 34e are hollow gears, and are rotatable on the input shaft 29.

A dog clutch 40 is a synchronous gear, which rotates at the same rotating speed as that of the output shaft 30 on the output shaft 30. When the rotating speed of the 1-speed output gear 31v is equal to that of the output shaft 30, the dog clutch 40 can be engaged with the 1-speed output gear 31v. When the driving force of the engine 11 transmitted to the 1-speed output gear 31v is zero, the dog clutch 40 can be disengaged with the 1-speed output gear 31v. The dog clutch 40 can be also engaged with and disengaged with the 2-speed output gear 32v and may also assume a neutral state not connected to any gear. Similarly, a dog clutch 41 can also be engaged with the 3-speed input gear 33e and the 4-speed input gear 34e and a dog clutch 42 can be engaged with the 5-speed output gear 35v and the backward output gear 36v. Further, a dog clutch 43 is disposed on the planetary gear output shaft 25 and can be engaged with the low speed gear 26 and the high speed gear 27. These dog clutches are driven by a shift controller 44. The shift controller 44 also controls the clutch actuator 23.

A hybrid controller module (HCM) 45 generally controls the engine 11, the M/G 17, the MAG 19, and the shift controller 44. Details of the hybrid controller module (HCM) 45 will be described later. An engine control unit (ECU) 46 controls factors derived from the output characteristics and the exhaust characteristics of the engine such as a fuel injection quantity and an intake air quantity of the engine in accordance with instructions of the HCM 45.

Hence, running by a motor using a driving force produced by the M/G 17 is also possible. That is, the dog clutch 43 is disengaged to engage any one dog clutch within the transmission 12 according to the running conditions of the vehicle while the clutch 22 is left disengaged. The M/G 17 is controlled so that the one-way clutch 28 may be operated. The planetary gear output shaft 25 is fixed, whereby the driving force of the M/G 17 is increased or doubled and is transmitted from the ring gear to the 2-speed input gear 32e. The driving force transmitted to the 2-speed input gear 32e is further increased or doubled through the 1-speed input gear 31e and the 1-speed output gear 31v, and is transmitted to the front wheel driving shaft 14. Since the 2-step speed change stage of the planetary gear and the 1-speed gear is present, the M/G 17 is able to drive the vehicle with a small torque.

Also, according to the vehicle driving apparatus of the present invention, engine starting by the M/G 17 is possible. The dog clutches 40, 41, 42, and 43 are disengaged to place them in a neutral state. The clutch 22 is engaged. The M/G 17 is controlled so that the one-way clutch 28 may be operated. The planetary gear output shaft 25 is fixed, whereby the driving force of the M/G 17 is increased or doubled and is transmitted from the ring gear to the 2-speed input gear 32e. The engine 11 is started by the driving force transmitted to the 2-speed input gear 32e. Since the torque of the M/G 17 is increased by the planetary gear 24, the M/G 17 can start the engine 11 with only a small torque.

Also, according to the vehicle driving apparatus of the present invention, the engine 11 may generate a driving force even when the vehicle speed is zero. The dog clutch 43 is engaged with the low speed gear 26 to transmit the driving force of the engine 11 to the front wheel driving shaft 14 through the planetary gear 24. At this time, the relation of the rotating speed of each of the input and output shafts is linear, and therefore, the rotating speed of the M/G 17 is controlled making the rotating speed of the planetary gear output shaft 25 zero. That is, even when the vehicle speed is zero, the driving force of the engine can be transmitted to the front wheel driving shaft.

According to the driving apparatus of the present invention, the torque assist is also enabled by the M/G 17 and the M/G 19. That is, it is possible that the dog clutch 43 is actuated to double the torque of the M/G 17 by the planetary gear 24 to apply torque assist to the front wheel driving shaft 14. Likewise, regeneration is also enabled by the M/G 17 and the M/G 19.

Further, according to the vehicle driving device of the present invention, the cooperation loss of the M/G 17 can be suppressed. That is, the dog clutch 40 is placed in a neutral state, whereby the M/G 17 stops due to its own cogging torque with the torque balance of the planetary gear 24 kept so that the carrier and the ring gear are idle. Therefore, the cooperation loss of the M/G 17 can be suppressed.

According to the vehicle driving device of the present invention, shockless speed change is also enabled. That is, the M/G 17 is controlled to transmit the driving force of the engine 11 through the planetary gear 24, whereby the driving force of the engine exerted on the dog clutch of the transmission 12 is zero while securing the driving force of the vehicle to enable switching the dog clutch. In other words, the driving force is constantly maintained during switching of the dog clutch by making, substantially equal, the primary driving force of the engine and a secondary driving force as exerted through the planetary gears.

Figure 2:
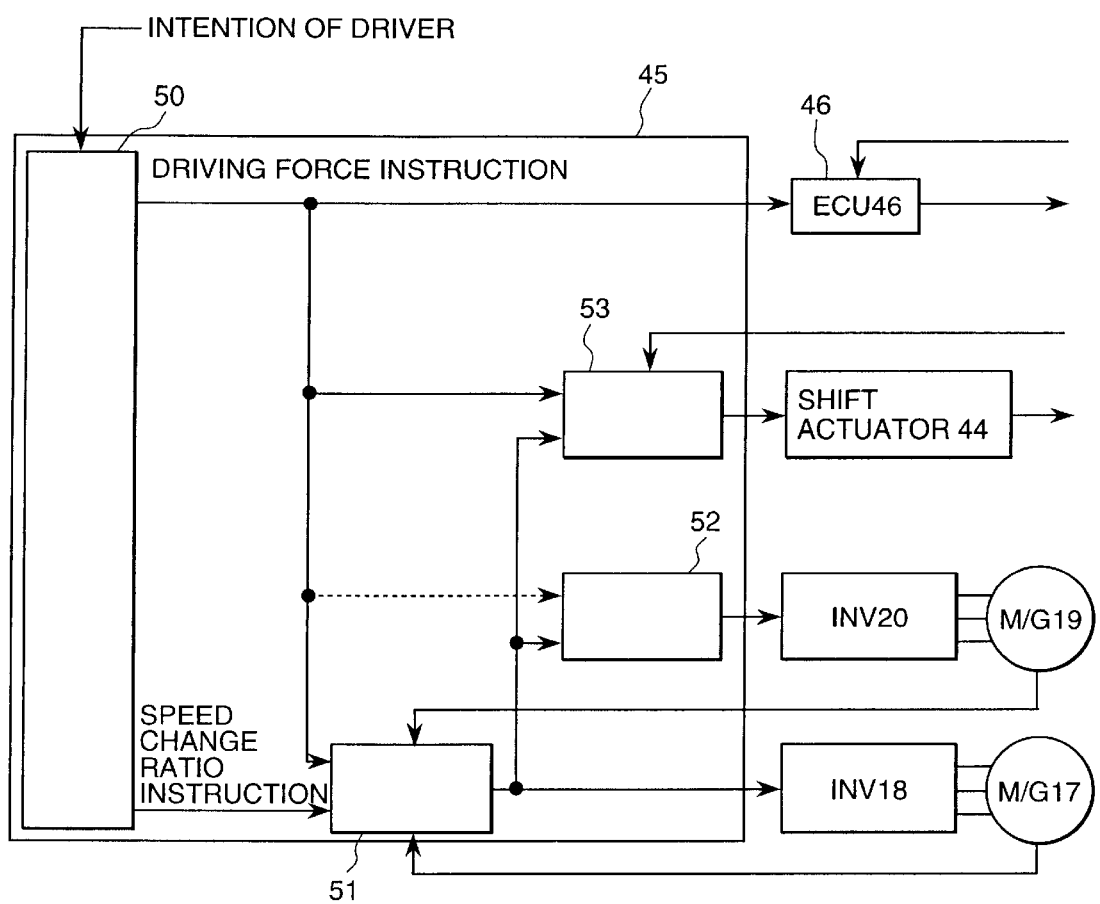
FIG. 2 illustrates a shockless speed change control apparatus in the embodiment of FIG. 1.

FIG. 2 shows a schematic view of a control apparatus including a hybrid controller module (HCM) 45 and an engine control unit ECU 46. The hybrid controller module (HCM) 45 has a host controller 50 for determining the optimum operating point of the engine 11 and the torque assist quantity to be provided by the M/G 19 according to the intention of a driver. The ECU 46 is a device for controlling the intake air quantity or the fuel injection quantity of the engine 11 according to instructions from the host controller 50 or information on the state of the engine. A control apparatus 51 of the M/G 17 imparts driving instructions of the M/G 17 to the inverter 18. A control apparatus 52 of the M/G 19 imparts drive instructions of the M/G 19 to the inverter 20. The M/G 17 control apparatus 51 prepares driving force instructions of the M/G 17 based on driving force instructions and speed change ratio instructions.

The M/G 19 control apparatus 52 prepares driving instructions of the M/G 19 based on M/G 17 driving instructions of the M/G 17 control apparatus 51 and vehicle driving instructions from the host controller 50. Therefore, M/G 17 and M/G 19 are harmonized. A shift controller 53 imparts dog clutch operating instructions to the shift actuator 44 based on driving instructions of the M/G 17 and driving force instructions of the vehicle. The shift controller 53 is controlled in harmony with the M/G 17 and the M/G 19.

Figure 3:
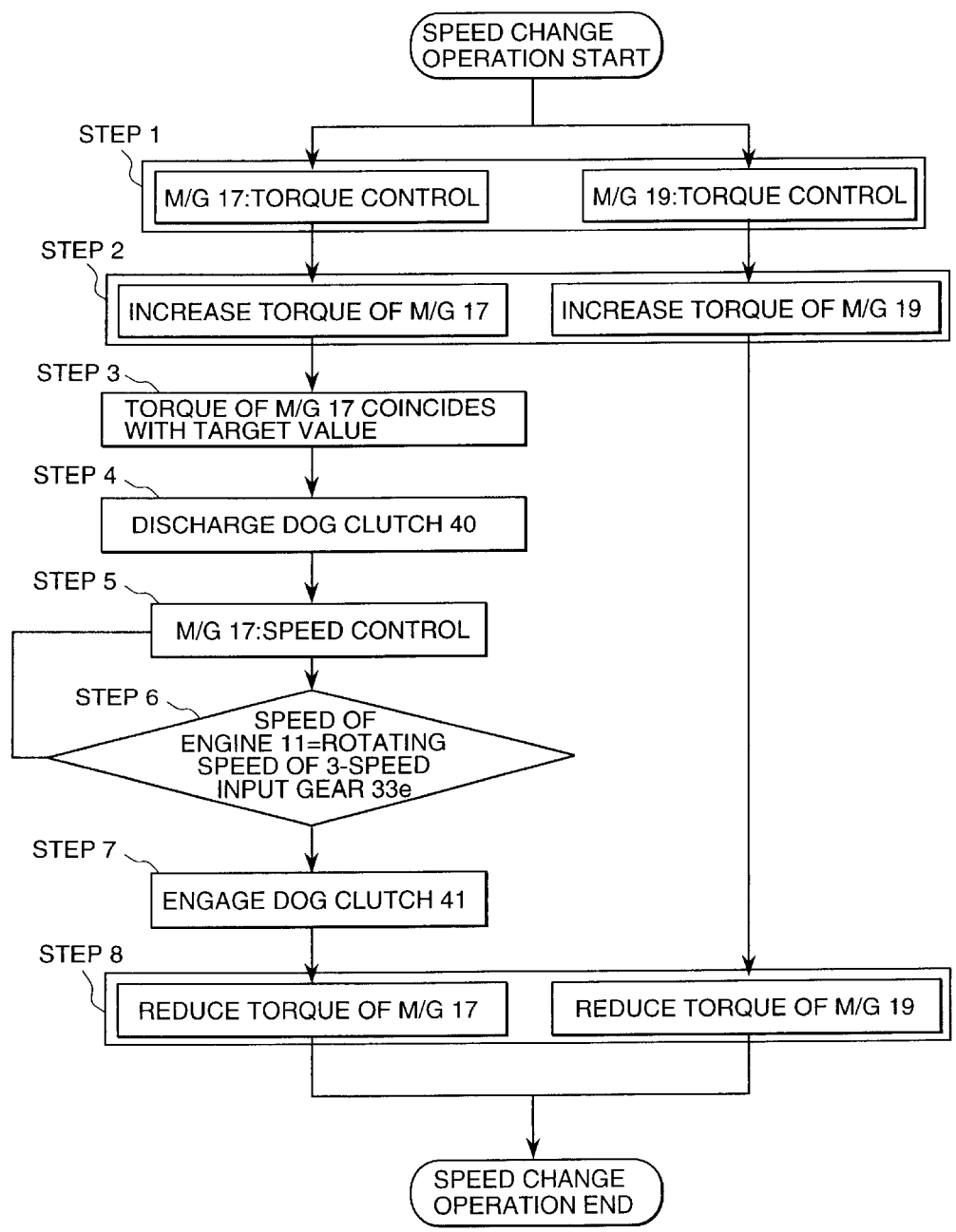
FIG. 3 is a flowchart of the shockless speed change operation in the embodiment of FIG. 1.

Next, a control flow of shockless speed change will be explained with reference to FIG. 3 for speed-changing from 2-speed to 3-speed. First, in Step 1, a torque is controlled for the M/G 17 and the M/G 19. In Step 2, responsiveness of torque control is adjusted for both M/G 17 and M/G 19. The adjustment quantity is calculated by the host controller according to the condition of a vehicle, the intention of a driver, and the condition of the engine or the battery. A map or a function may be applied in advance. Further, even fixed value can be controlled so as to be free from an unpleasant feeling for a driver. The procedure proceeds, via Step 2, to Step 3 in which the torque of the M/G 17 coincides with a target value. The target value of the M/G 17 is calculated by the host controller according to the condition of the engine or the battery. In Step 3, when the torque of the M/G 17 becomes equal to a target value, the procedure proceeds to Step 4.

In Step 4, the dog clutch 40 is disengaged. In Step 3, when the torque of the M/G 17 becomes equal to a target value, since the engine torque is transmitted to the driving shaft through the planetary gear, the engine torque exerted on the dog clutch 40 is about zero. Therefore, the dog clutch 40 can be disengaged with ease. Then, in Step 5, the speed of the M/G 17 is controlled. Since the engine speed corresponds to that of the 2-speed, the engine speed is changed to that corresponding to the 3-speed. During that period, the M/G 19 is subjected to torque control. In Step 6, the engine speed is compared with the rotating speed of the 3-speed input gear 33e. If the engine speed coincides with the rotating speed of the 3-speed input gear 33e, the procedure proceeds to Step 7. If not, the procedure returnes to Step 5, in which the control of the engine speed is carried out.

In Step 7, the dog clutch 41 is engaged. Since the engine speed coincides with the rotating speed of the 3-speed input gear 33e, the dog clutch 41 can be engaged with ease. After completion of Step 7, the procedure proceeds to Step 8. In Step 8, torques of the M/G 17 and the M/G 19 are reduced. A reducing degree at that time is calculated by the host controller according to the condition of a vehicle, intention of a driver, and the condition of the engine or the battery. When the torques of the M/G 17 and the M/G 19 indicate zero, the speed change operation is completed.

Figure 4:
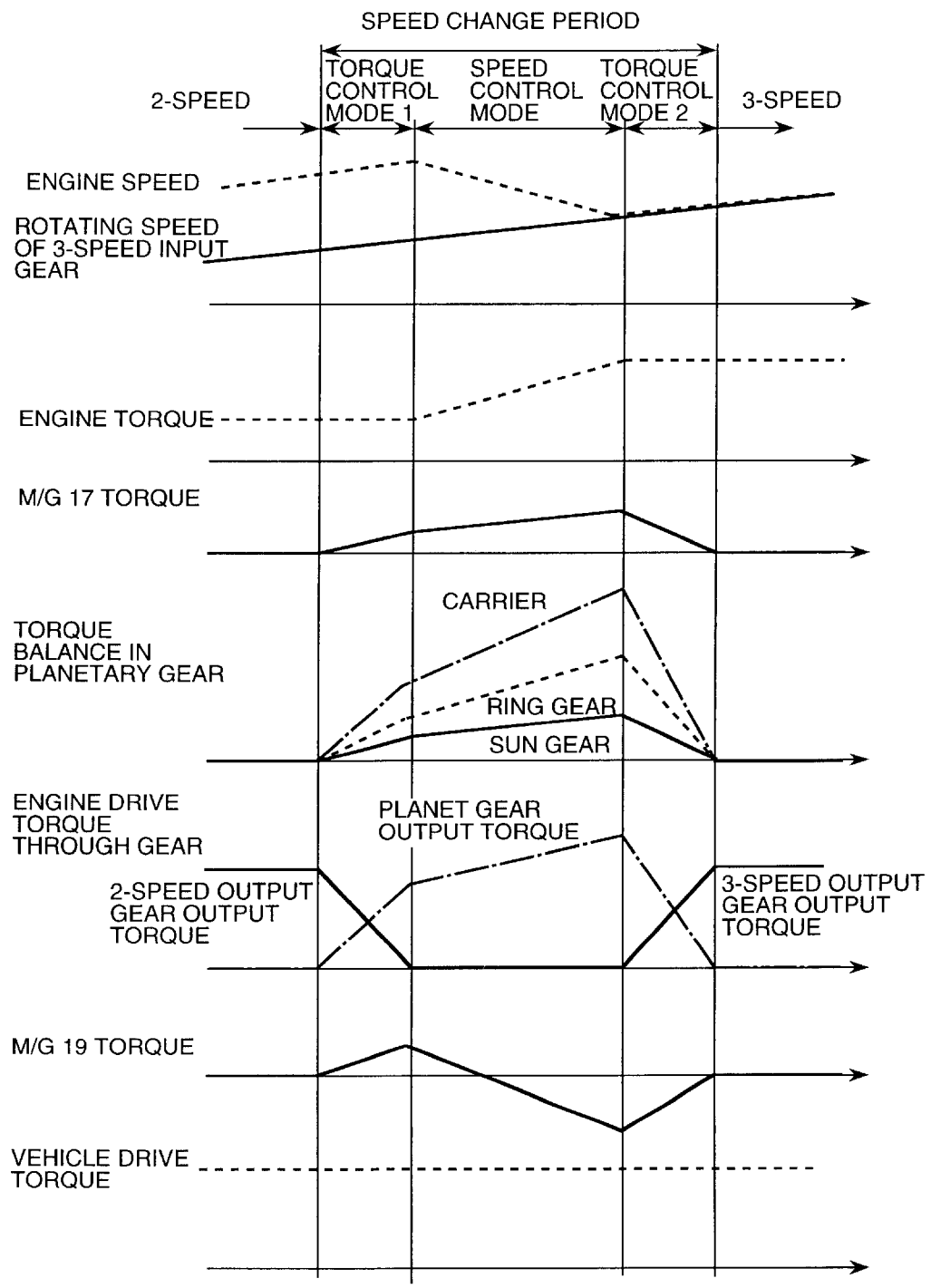
FIG. 4 illustrates the shockless speed change operation in the embodiment of FIG. 1.

Next, FIG. 4 schematically represents operation of components at the time of shockless speed change from the 2-speed to the 3-speed. In a state of running at the 2-speed, the dog clutch 43 is engaged with the low speed gear 26. At that time, the torque of the M/G 17 is set to zero, whereby the input and output shafts of the planetary gear 24 are rotatable. As a result, easy engagement can be made, and no shock at the time of engagement occurs. In the speed change operation, first, the torque of the M/G 17 is increased. Thus, the torque occurring in the ring gear of the planetary gear is increased to introduce the driving force of the engine 11 into the planetary gear 24. This state is called a torque control mode 1.

In the torque control mode 1, the M/G 17 carries out a torque control. The 2-speed gear output torque decreases as the torque of the M/G 17 increases. Therefore, the vehicle driving force is insufficient only by the driving force of the engine 11. So, the insufficient part is compensated for by the M/G 19. The M/G 19 is subjected to torque control. When the torque generated in the ring gear becomes equal to that of the engine 11, the dog clutch 40 engaged with the 2-speed is disengaged. At this time, since the torque of the 2-speed output gear 32v is about zero, the dog clutch 40 can be disengaged with ease.

In the next stage of the speed change operation, the speed of the engine 11 is changed to the rotating speed of the 3-speed. That is, the variable speed change occurs between the 2-speed and the 3-speed. At this time, this state is called a speed control mode. In the speed control mode, the M/G 17 is subjected to speed control. The driving force of the engine 11 is transmitted to the front wheel driving shaft 14 through the planetary gear 24. Since the planetary gear output torque 25 is linear relative to the torque of the M/G 17, overs and shortages of the driving force occur. So, the driving force is compensated for by the M/G 19 similarly to that mentioned previously. The M/G 19 is subjected to torque control.

In the final stage of the speed change operation, when the speed of the engine 11 coincides with that of the 3-speed input gear 33e, the dot clutch 41 is engaged. Thereafter, the torques of the M/G 17 and the M/G 19 are reduced. This state is called a torque control mode 2. In the torque control mode 2, when the torques of the M/G 17 and the M/G 19 indicate zero, the speed change operation is completed.

Hence, the present invention provides a driving apparatus for a vehicle comprising an engine for providing a primary driving force to a driving shaft and an auxiliary power plant connected with the engine through a transmission. The transmission comprises an input shaft for inputting the primary driving force from the engine and an output shaft connected to the input shaft for transmitting the primary driving force to the driving shaft wherein the auxiliary power plant provides a secondary driving force to the driving shaft during a shifting in speed.

Figure 5:
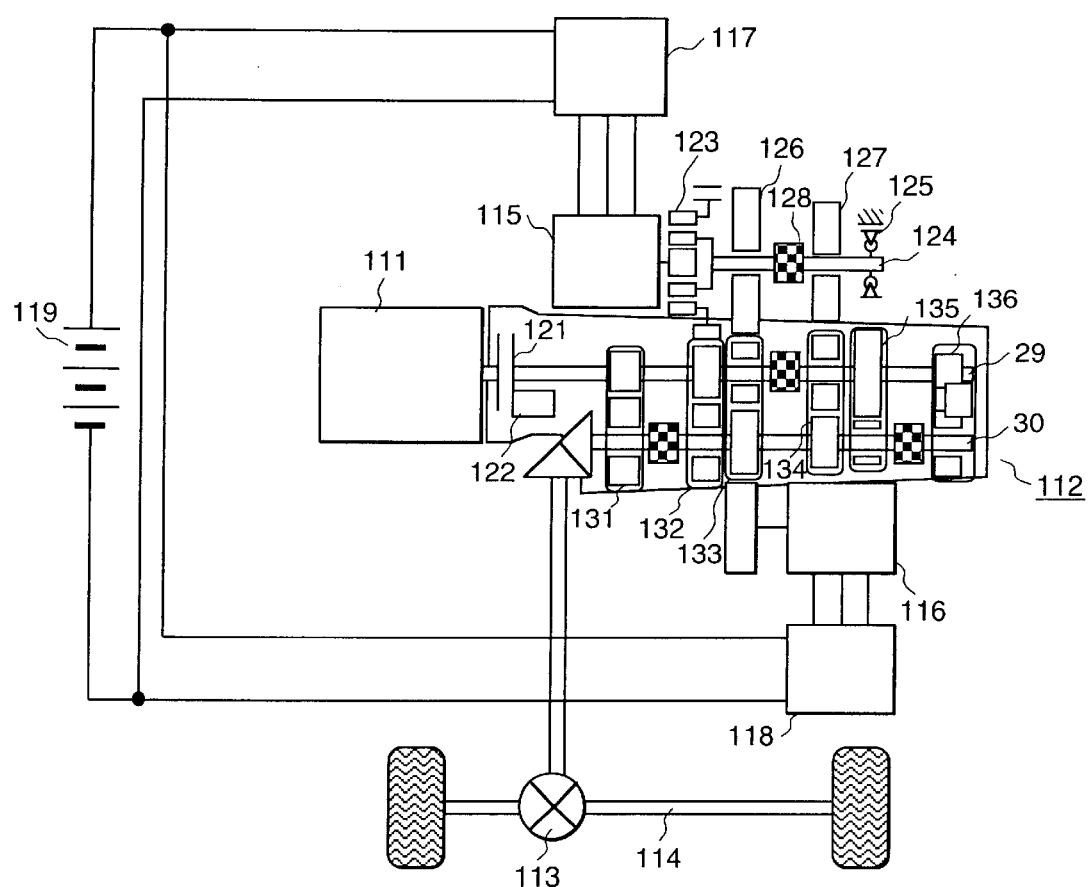
FIG. 5 illustrates a vehicle loaded with a driving apparatus according to another embodiment of the present invention.

Next, FIG. 5 is a view showing the system constitution of a vehicle loaded with a driving apparatus of another embodiment according to the present invention. In this embodiment, the driving force of an engine 111 is changed in speed by a transmission 112 according to the condition of a vehicle, and is transmitted to a driving shaft 114 through a differential gear 113. The transmission 112 is a transmission in which a shaft on the engine 111 side and a shaft on the driving shaft 114 side are arranged in parallel, and having forward 5 stages and backward 1 stage. A 1-speed 131, a 2-speed 132, a 5-speed 131, and backward 136 have, on the shaft on the driving shaft 114 side, a shaft of the transmission 112, and dog clutches for engaging and disengaging each speed change gear. A 3-speed 133 and a 4-speed have, on the shaft of the engine 111, the shaft of the transmission 112 and a dog clutch for engaging and disengaging each speed change gear. Though not shown, each dog clutch engages and disengages by a shift actuator. The clutch 121 is a device for transmitting the driving force of the engine 111 to the transmission 112 or interrupting the same. The clutch actuator 122 is a device for actuating the clutch 121.

M/G 115 and M/G 116 are electric motors, and are driven by a driving device 117 of the M/G 115 and a driving device 118 of the M/G 116, respectively. A battery 119 is a power storing device for supplying driving power to the M/G 115 and the M/G 116 or storing generated power.

A planetary gear 123 has input and output shafts of a sun gear, a carrier, and a ring gear. The sun gear, the carrier, and the ring gear are respectively connected to the M/G 115, a planetary gear output shaft 124, and an input gear, arranged on the shaft of the engine 111 side, of the 2-speed 132 of the transmission 112. On the planetary gear output shaft 124 are arranged a low speed gear 126 meshed with an input gear on a shaft of the engine 111, of the 3-speed 133 of the transmission 112, and a high speed gear 127 meshed with an input gear, arranged on a shaft of the engine 111, of the 4-speed 134 of the transmission 112. Likewise, the low speed gear 126 and the high speed gear 127 are selectively engaged with and disengaged with the planetary gear output shaft 124 by the dog clutch 128 on the planetary gear output shaft 124.

In a case where the motor M/G 115 carries out the torque assist or the like when changing speed, a one-way clutch 125 can be actuated to amplify the torque by the planetary gear 123 for transmission. The motor M/G 116 is connected to the shaft on the driving shaft 114 side of the transmission 112. Here, the M/G 115 and the M/G 116 are disposed on the same driving shaft, and therefore, the control of the shockless speed change is made easier than that in the constitution of FIG. 1.

Figure 6:
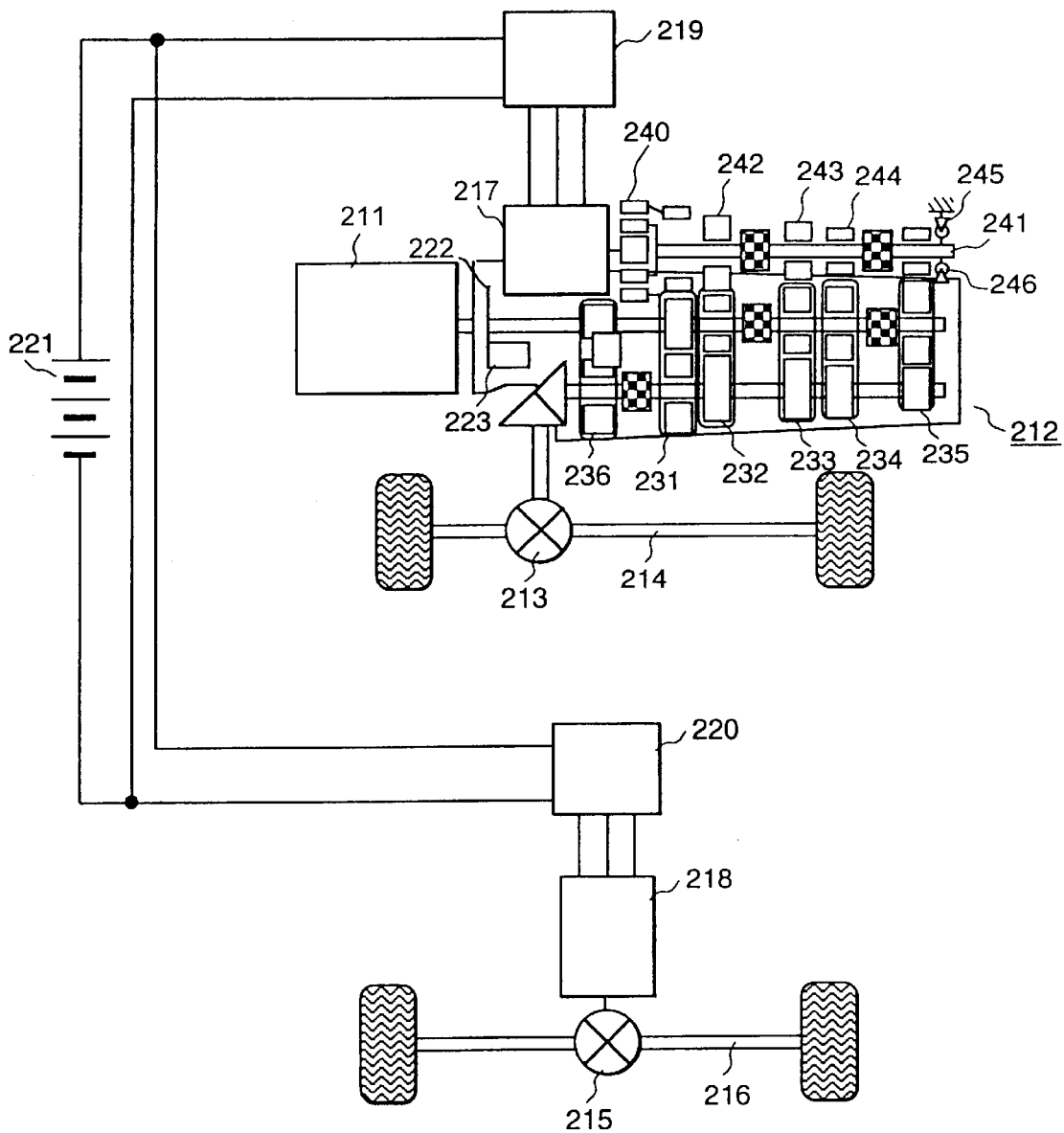
FIG. 6 illustrates a vehicle loaded with a driving apparatus according to another embodiment of the present invention.

Next, FIG. 6 illustrates a vehicle loaded with a driving apparatus according to another embodiment of the present invention. The driving force of an engine 211 is changed in speed by a transmission 212 according to the condition of a vehicle, and is transmitted to a driving shaft 214 through a differential gear 213. The transmission 212 is a transmission in which a shaft on the engine 211 side and a shaft on the driving shaft 214 side are arranged in parallel, having forward 5 stages and a backward one stage. A 1-speed 231 and a backward 236 have, on the shaft on the driving shaft 214 side, a dog clutch for engaging and disengaging the shaft of the transmission 212 with each speed change gear. A 2-speed 232, a 3-speed 233, a 4-speed 234, and a 5-speed 235 have, on the shaft on the engine 211 side, dog clutches for engaging and disengaging the shaft of the transmission 212 with each speed change gear. Though not shown, the dog clutch realizes engaging and disengaging states under the operation of a shift actuator.

The clutch 222 is a device for transmitting the driving force of the engine 211 to the transmission 212 or interrupting the same. The clutch actuator 223 is a device for actuating a clutch 222. M/G 217 and M/G 218 are electric motors, and are driven by a driving device 219 of the M/G 217 and a driving device 220 of the M/G 218, respectively. A battery 221 is a power storing device for supplying driving power to the M/G 217 and the M/G 218 or storing generated power.

A planetary gear 240 has input and output shafts of a sun gear, a carrier, and a ring gear. The sun gear, the carrier, and the ring gear are respectively connected to the M/G 217, a planetary gear output shaft 241, and an input gear, arranged on the shaft of the engine, of the 1-speed 231 of the transmission 212. On the planetary gear output shaft 241 are arranged a 1–2 speed change gear 242, a 2–3 speed change gear 243, a 3–4 speed change gear 244, and a 4–5 speed change gear 245 meshed with gears on the shaft on the engine 211 side of a 2-speed 232, a 3-speed 233, a 4-speed 234, and a 5-speed 235, respectively.

An output shaft of the M/G 218 is connected to a differential gear 215, and the driving force of the M/G 218 is transmitted to a driving shaft 216 through the differential gear 215. When the M/G 217 carries out a torque assist or the like, a one-way clutch 246 is actuated, and the torque can be amplified by the planetary gear 240 for transmission. In FIG. 6, the 1–2 speed change gear 242, the 2–3 speed change gear 243, the 3–4 speed change gear 244, and the 4–5 speed change gear 245 on the planetary gear output shaft 241 are switched according to the speed change to thereby enable variable speed change between all the speed change gears with a small motor capacity.

Figure 7:
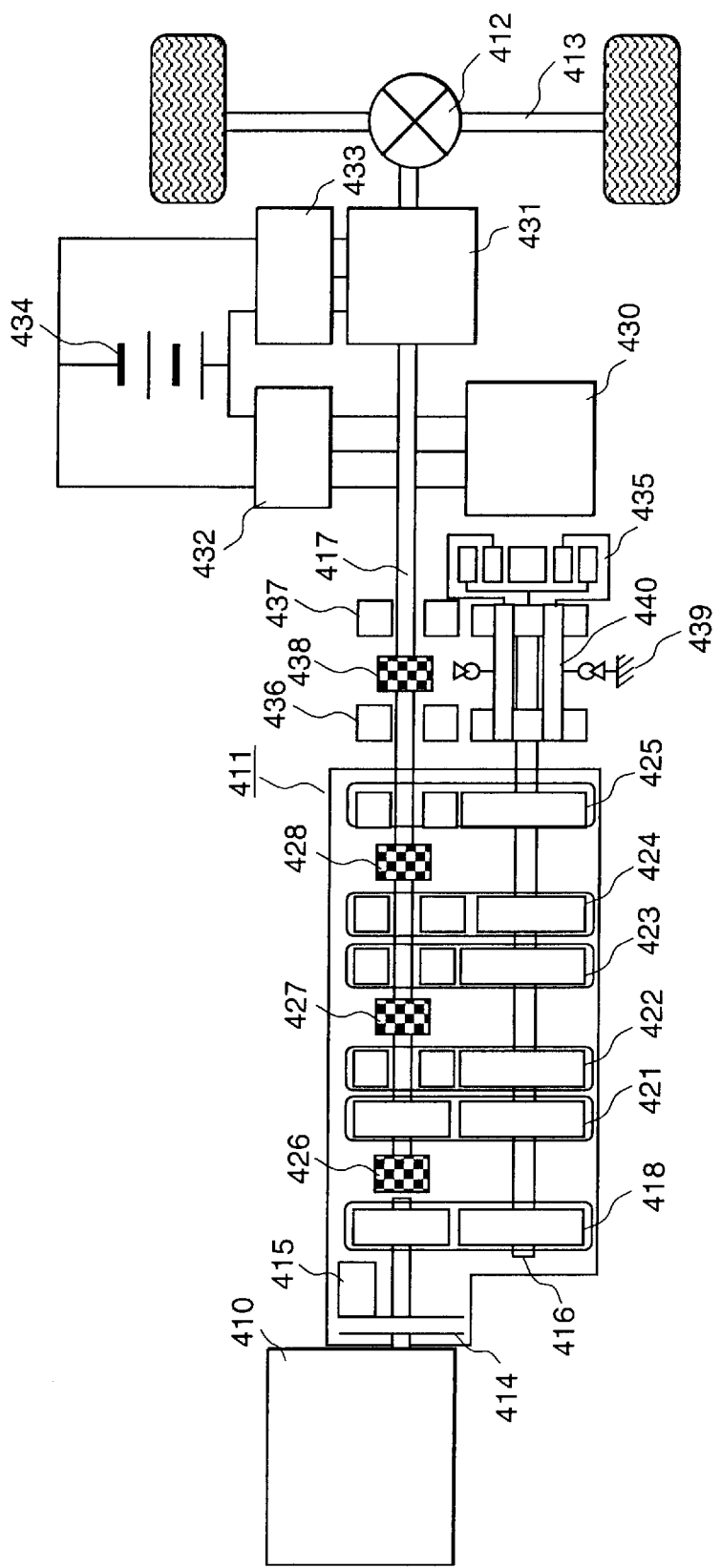
FIG. 7 illustrates a vehicle loaded with a driving apparatus according to another embodiment of the present invention.

FIG. 7 illustrates a vehicle loaded with a driving apparatus according to another embodiment of the present invention, which is a constitution particularly suited to a rear wheel driving vehicle. The driving force of an engine 410 is changed in speed by a transmission 411 according to the condition of a vehicle, and is transmitted to a driving shaft 413 through a differential gear 412. A clutch 414 is a device for transmitting the driving force of the engine 410 to the transmission 411 or interrupting the same. A clutch actuator 415 is a device for actuating a clutch 414. The transmission 411 is a transmission in which a counter shaft 416 and an output shaft 417 are arranged in parallel, having forward 5 stages and a backward 1 stage. The driving force of the engine 410 is transmitted to the counter shaft 416 through a speed change stage 418. 1-speed paired gears 421, 2-speed paired gears 422, 3-speed paired gears 423, 5-speed paired gears 424, and backward paired gears 425 include a pair of gears, and 4-speed is realized by directly connecting a dog clutch 426 to the engine 410.

Further, the dog clutch 426 is engaged with the 1-speed paired gears 421 to realize the 1-speed. A dog clutch 427 is engaged with the 2-speed paired gears 422 or the 3-speed paired gears 423 to realize the 2-speed and 3-speed. A dog clutch 428 is engaged with the 5-speed paired gears 424 or the backward paired gears 425 to realize the 5-speed and the backward. Though not shown, the dog clutch realizes engaging and disengaging states under the operation of the shift actuator. M/G 430 and M/G 431 are electric motors, which are driven by a driving device 432 of the M/G 430 and a driving device 433 of the M/G 431, respectively. A battery 434 is a power storage device for supplying driving power to the M/G 430 and the M/G 431 or storing generated power.

A planetary gear 435 has input and output shafts of a sun gear, a carrier and a ring gear. The sun gear, the carrier, and the ring gear are connected to M/G 430, a planetary gear output shaft 440, and a counter shaft 416 of the transmission 411, respectively. On the planetary gear output shaft 440 are arranged two sets of paired gears of low speed paired gears 436 and high speed paired gears 437, which are selectively engaged with the output shaft 417 by a dog clutch 438. The M/G 431 is arranged on the output shaft 417.

In this constitution, the gear of the conventional transmission is not used as a transmission channel of output from the planetary gear as shown in FIG. 1. Therefore, the gear ratio between the low speed gear 436 and the high speed gear 437 can be designed freely to facilitate designing the M/G driving force. While two sets of paired gears are disposed on the planetary gear output shaft 440, it is noted that two or more sets can be arranged to enable further miniaturization of M/G and reduction of shock.

Figure 8:
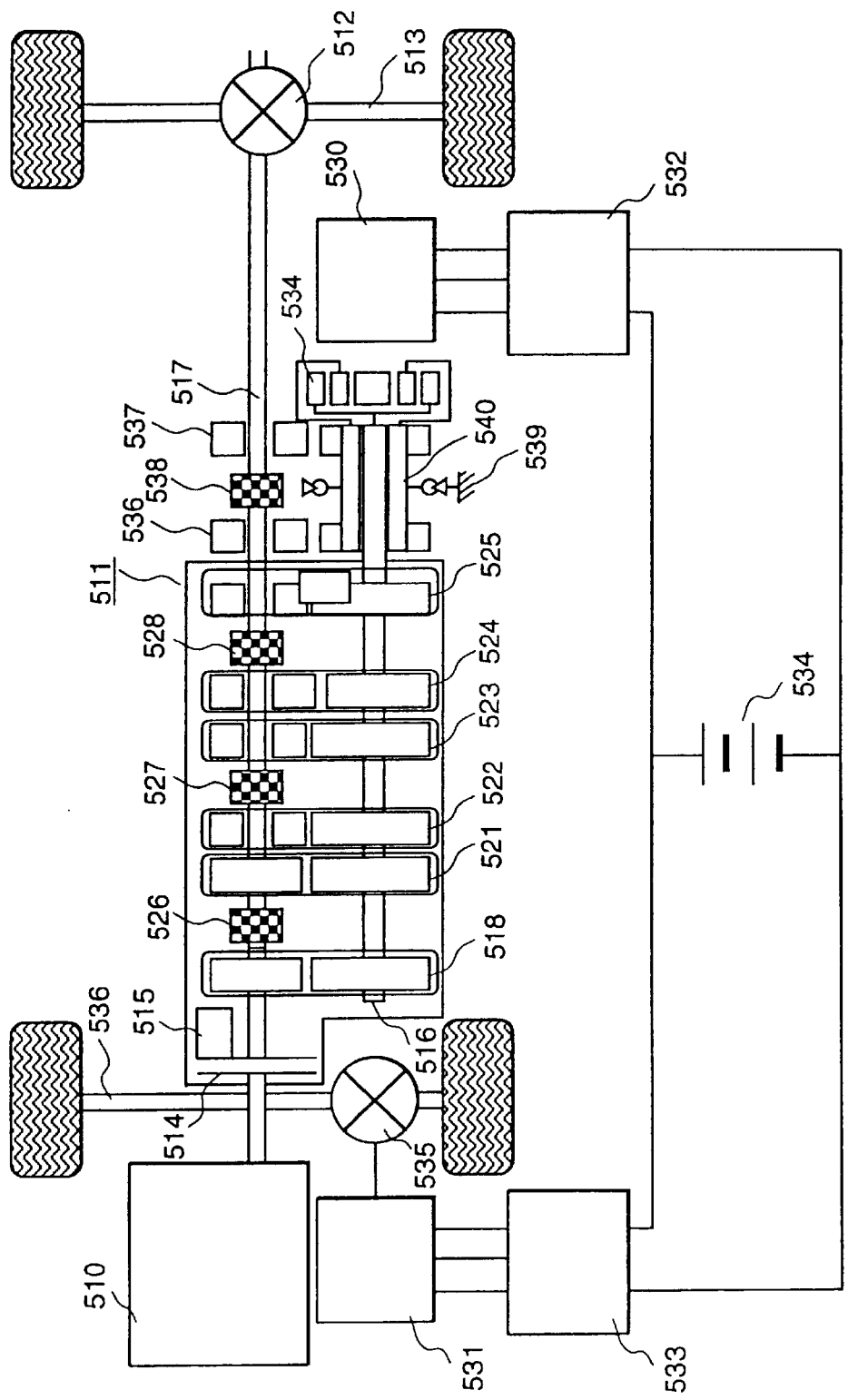
FIG. 8 illustrates a vehicle loaded with a driving apparatus according to another embodiment of the present invention.

FIG. 8 illustrates a vehicle loaded with a driving apparatus device according to another embodiment of the present invention, which is a constitution particularly suited to a rear wheel driving vehicle. The driving force of an engine 510 is changed in speed by a transmission 511 according to the condition of a vehicle, and is transmitted to a driving shaft 513 through a differential gear 512. A clutch 514 is a device for transmitting the driving force of the engine 510 to the transmission 511 or interrupting the same. A clutch actuator 515 is a device for actuating a clutch 514. The transmission 511 is a transmission in which a counter shaft 516 and an output shaft 517 are arranged in parallel, having forward 5 stages and a backward one stage. The driving force of the engine 510 is transmitted to the counter shaft 516 through a speed change stage 518. 1-speed paired gears 521, 2-speed paired gears 522, 3-speed paired gears 523, 5-speed paired gears 524, and backward paired gears 525 include a pair of gears, and a 4-speed is realized by directly connecting a dog clutch 526 to the engine 510. Further, the dog clutch 526 is engaged with the 1-speed paired gears 521 to thereby realize the 1-speed. A dog clutch 527 is engaged with the 2-speed paired gears 522 or the 3-speed paired gears 523 to realize the 2-speed and the 3-speed. A dog clutch 528 is engaged with the 5-speed paired gears 524 or the backward paired gears 525 to realize the 5-speed and the backward. Though not shown, the dog clutches realize engaging and disengaging states under the operation of the shift actuator.

M/G 530 and M/G 531 are rotational motors, which are driven by a driving device 532 of the M/G 530 and a driving device 533 of the M/G 531, respectively. A battery 534 is a power storage device for supplying driving power to the M/G 530 and the M/G 531 or storing generated power. A planetary gear 534 has input and output shafts of a sun gear, a carrier and a ring gear. The sun gear, the carrier, and the ring gear are connected to M/G 530, a planetary gear output shaft 540, and a counter shaft 516 of the transmission 511, respectively. On the planetary gear output shaft 540 are arranged two sets of paired gears of low speed paired gears 536 and high speed paired gears 537, which are selectively engaged with the output shaft 517 by a dog clutch 538. The M/G 531 drives a driving shaft 536 through a differential gear 535. In this constitution, it is possible to easily change the rear wheel driving vehicle to 4WD.

Figure 9:
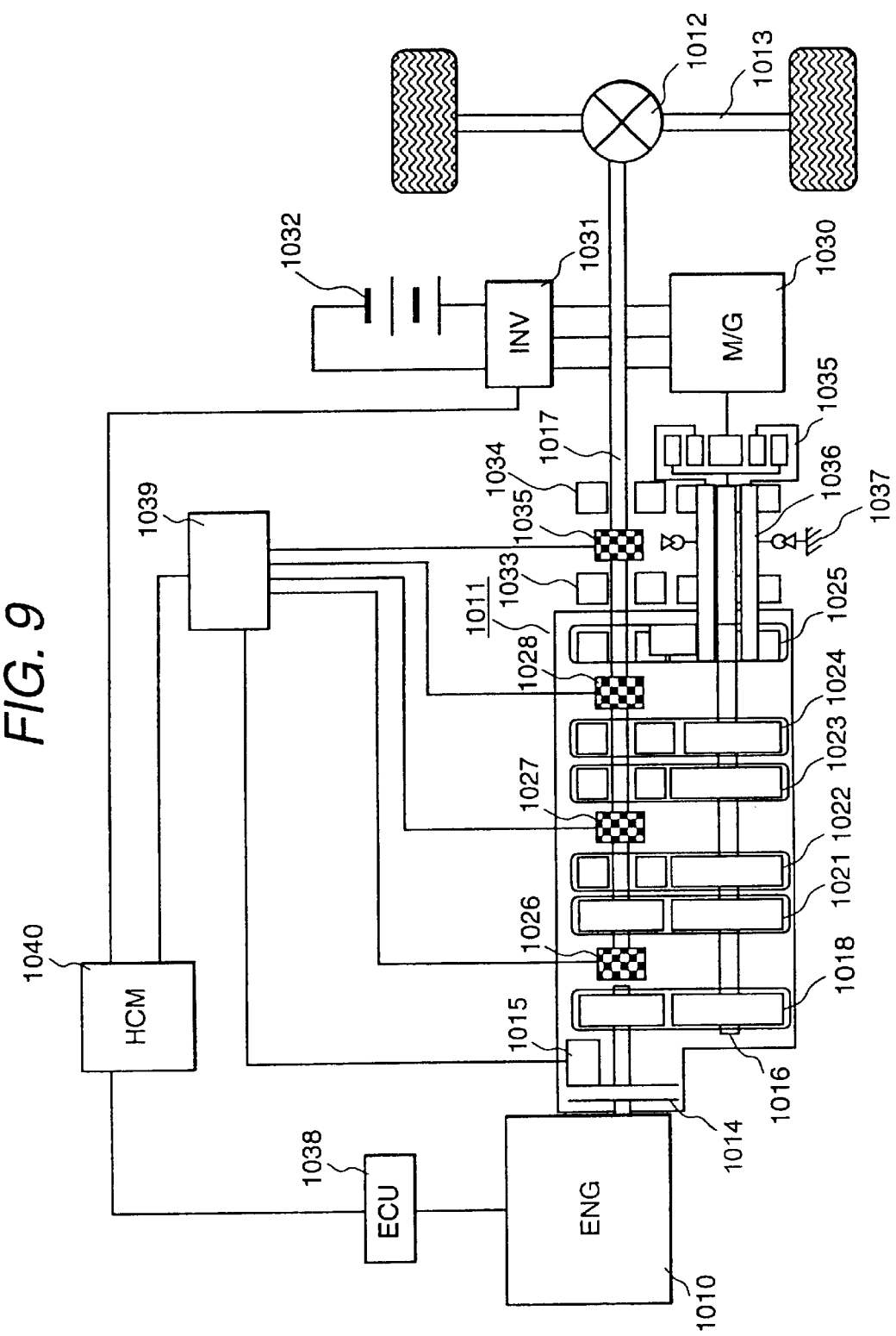
FIG. 9 illustrates a vehicle loaded with a driving apparatus according to another embodiment of the present invention.

FIG. 9 illustrates a vehicle loaded with a driving apparatus according to another embodiment of the present invention. The driving force of an engine 1010 is changed in speed by a transmission 1011 according to the condition of a vehicle, and is transmitted to a driving shaft 1013 through a differential gear 1012. A clutch 1014 is a device for transmitting the driving force of the engine 1010 to the transmission 1011 or interrupting the same. A clutch actuator 1015 is a device for actuating a clutch 1014. The transmission 1011 is a transmission in which a counter shaft 1016 and an output shaft 1017 are arranged in parallel, having forward 5 stages and a backward one stage. The driving force of the engine 1010 is transmitted to the counter shaft 1016 through a speed change stage 1018. 1-speed paired gears 1021, 2-speed paired gears 1022, 3-speed paired gears 1023, 5-speed paired gears 1024, and backward paired gears 1025 include a pair of gears, and a 4-speed is realized by directly connecting a dog clutch 1026 to the engine 1010. Further, the dog clutch 1026 is engaged with the 1-speed paired gears 1021 to thereby realize the 1-speed. A dog clutch 1027 is engaged with the 2-speed paired gears 1022 or the 3-speed paired gears 1023 to realize the 2-speed and the 3-speed. A dog clutch 1028 is engaged with the 5-speed paired gears 1024 or the backward paired gears 1025 to realize the 5-speed and the backward. The dog clutch realizes engaging and disengaging states under the operation of the shift actuator 1039.

M/G 1030 is an electric motor, which is driven by an inverter. A battery 1032 is a power storage device for supplying driving power to the M/G 1030 and storing generated power. A planetary gear 1035 has input and output shafts of a sun gear, a carrier and a ring gear. The sun gear, the carrier, and the ring gear are connected to the M/G 1030, a planetary gear output shaft 1036, and the counter shaft 1016 of the transmission 1011, respectively. On the planetary gear output shaft 1036 are arranged three sets of paired gears of low speed paired gears 1033, high speed paired gears 1034, and a back gear 1025, which are selectively engaged with the output shaft 1017 by the dog clutches 1035 and 1028.

A two-way clutch 1037 is able to limit a rotating direction of the planetary gear output shaft 1036. The two-way clutch 1037 makes free rotation of the planetary gear output shaft 1036 when the back gear 1025 is used. The two-way clutch 1037 limits a rotating direction of the planetary gear output shaft 1036 when a gear other than the back gear 1025 is used. A hybrid controller module (HCM) 1040 generally controls the engine 1010, the M/G 1030, and the shift actuator 1039. An engine control unit (ECU) 1038 controls factors derived from the output characteristics and the exhaust characteristics of the engine such as a fuel injection quantity and an intake air quantity of the engine 1010.

In this constitution, since the gear of the conventional transmission is not used as a transmission channel of output from the planetary gear as in FIG. 1, the gear ratio between the low speed gear 1033 and the high speed gear 1034 can be freely designed. Further, since the back gear 1025 is disposed on the planetary gear output shaft 1036, the back gear 1025 can be used to amplify or double the torque of the M/G 1030. At this time, the two-way clutch 1037 makes free rotation of the planetary gear output shaft 1036. The shockless speed change in this constitution is carried out by the harmonized control between the engine 1010 and the M/G 1030.

Figure 10:
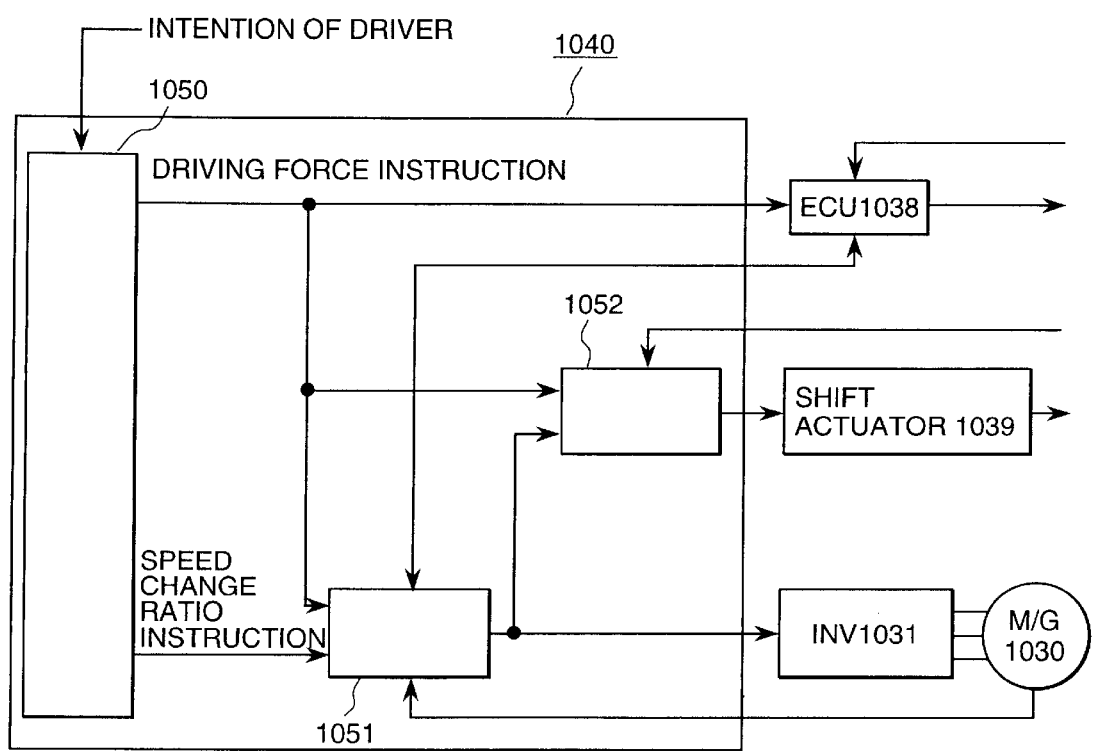
FIG. 10 illustrates a shockless speed change control apparatus in the embodiment of FIG. 9.

FIG. 10 shows a schematic view of a control apparatus including the hybrid controller module (HCM) 1040 in the embodiment shown in FIG. 9. The hybrid controller module (HCM) 1040 has a host controller 1050 for determining the optimum operating point of the engine 1010 and the torque assist quantity to be provided by the M/G 1030 according to the intention of a driver. The ECU 1038 is a device for controlling the intake air quantity or the fuel injection quantity of the engine 1010 according to instructions from the host controller 1050 or information on the state of the engine 1010. The shift controller 1052 gives instructions of the operating time of the dog clutch to the shift actuator 1039. A control apparatus 1051 of the M/G 1030 gives driving instructions of the M/G 1030 to the inverter 1031.

The ECU 1038 transmits driving force instructions of the engine 1010 to the M/G 1030 control apparatus 1051. Further, the M/G 1030 control apparatus 1051 gives driving force instructions of the M/G 1030 to the ECU 1038. The M/G 1030 control apparatus 1051 prepares instructions of the engine 1010 driving force from the ECU 1038, vehicle driving instructions from the host controller 50, and driving instructions of the M/G 1030 from speed change ratio instructions. Therefore, the engine 1010 and the M/G 1030 are harmonized. The shift controller 1052 gives dog clutch operating instructions to the shift actuator 1039 based on driving instructions of the M/G 1030 and driving force instructions of a vehicle. The shift controller 1052 is also controlled in harmony with the M/G 1030.

Figure 11:
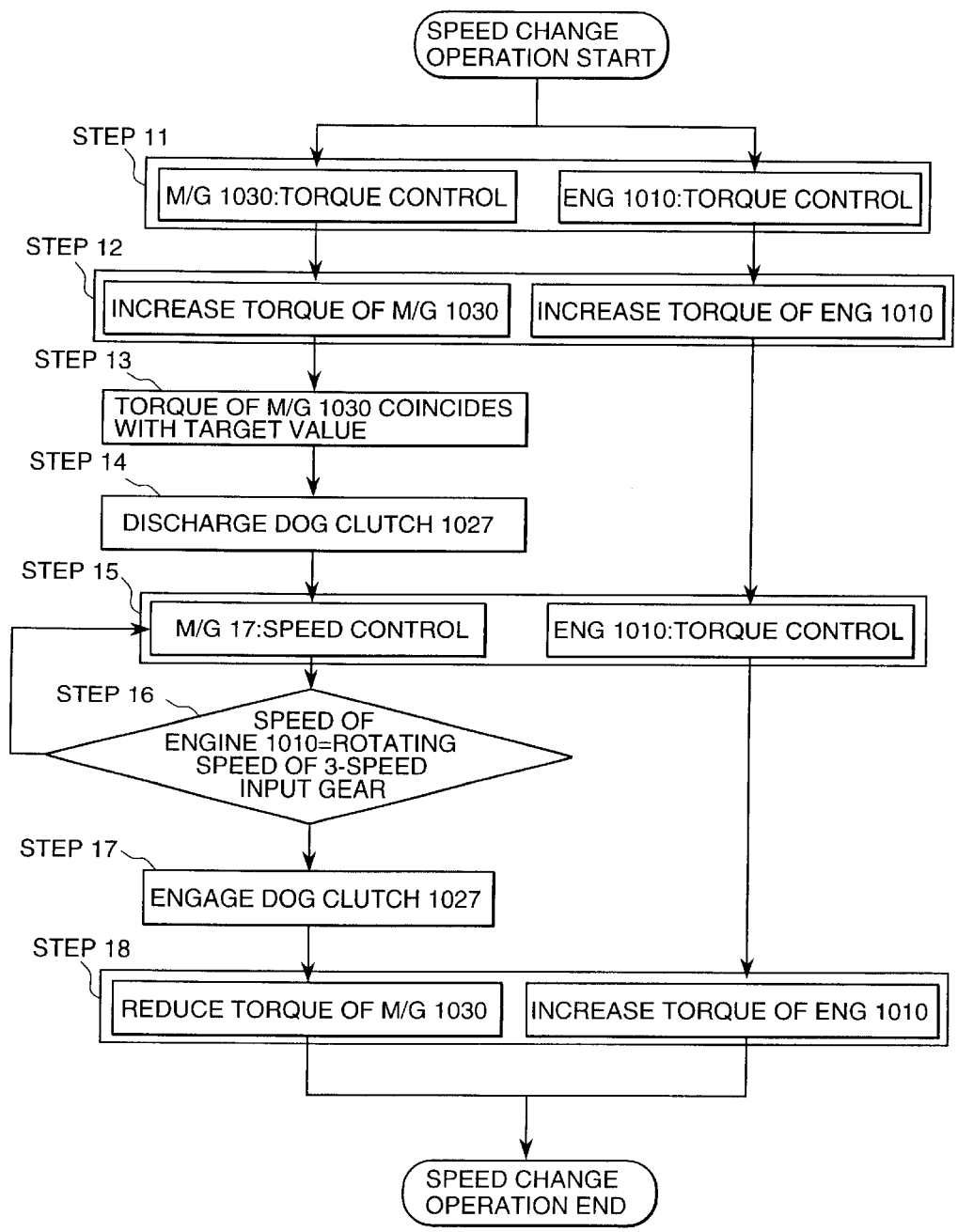
FIG. 11 is a flowchart illustrating the shockless speed change operation in the embodiment of FIG. 9.

Next, a control flow of the shockless speed change in the embodiment shown in FIG. 9 will be explained with reference to FIG. 11. In Step 11, the M/G 1030 and the engine 1010 are subjected to torque control. In Step 12, responsiveness of torque control is adjusted for the M/G 1030 and the engine 1010. The adjusted quantity is calculated by the host controller according to the condition of a vehicle, the intention of a driver, and the conditions of the engine and the battery. A map or a function may be applied in advance. Further, even fixed value can be controlled to alleviate torque. The procedure proceeds to Step 13 in which torque of the M/G 1030 coincides with a target value through Step 12. The target value of the torque of the M/G 1030 is such that a torque applied to the dog clutch 1027 enables the dog clutch to be disengaged, and is calculated by the host controller according to the conditions of the engine and the battery. In Step 13, when the torque of the M/G 1030 becomes equal to the target value, the procedure proceeds to Step 14.

In Step 14, the dog clutch 1027 is disengaged with the 2-speed. When in Step 13, the torque of the M/G 1030 indicates a target value, since the engine torque is transmitted to the driving shaft through the planetary gear, the engine torque applied to the dog clutch 1027 is about zero. Therefore, the dog clutch 1027 can be disengaged with ease. Then, in Step 15, the M/G 1030 is subjected to speed control. Since the engine speed corresponds to that of the 2-speed, the engine speed is changed to the engine speed corresponding to the 3-speed.

In Step 16, the speed of the engine 1010 is compared with the rotating speed of the 3-speed output gear. If the engine speed coincides with the rotating speed of the 3-speed output gear, the procedure proceeds to Step 17. If not coincided, the procedure is returned to Step 15, where speed control of the M/G 1030 is carried out in order to coincide with the engine speed. During that period, a torque is controlled in the engine 1010 so that the vehicle driving force is constant. In Step 17, the dog clutch 1027 is engaged with the 3-speed gear. Since the engine speed coincides with the rotating speed of the 3-speed input gear 33e, the dog clutch 1027 can be engaged with ease. After completion of Step 17, the procedure proceeds to Step 18.

Finally, in Step 18, the torque of M/G 1030 is reduced. A reducing degree at this time is calculated by the host controller according to the condition of a vehicle, the intention of a driver, the conditions of the engine and the battery. When the torque of the M/G 1030 indicates zero, the speed change operation is completed. The engine 1010 adjusts the output torque.

Figure 12:
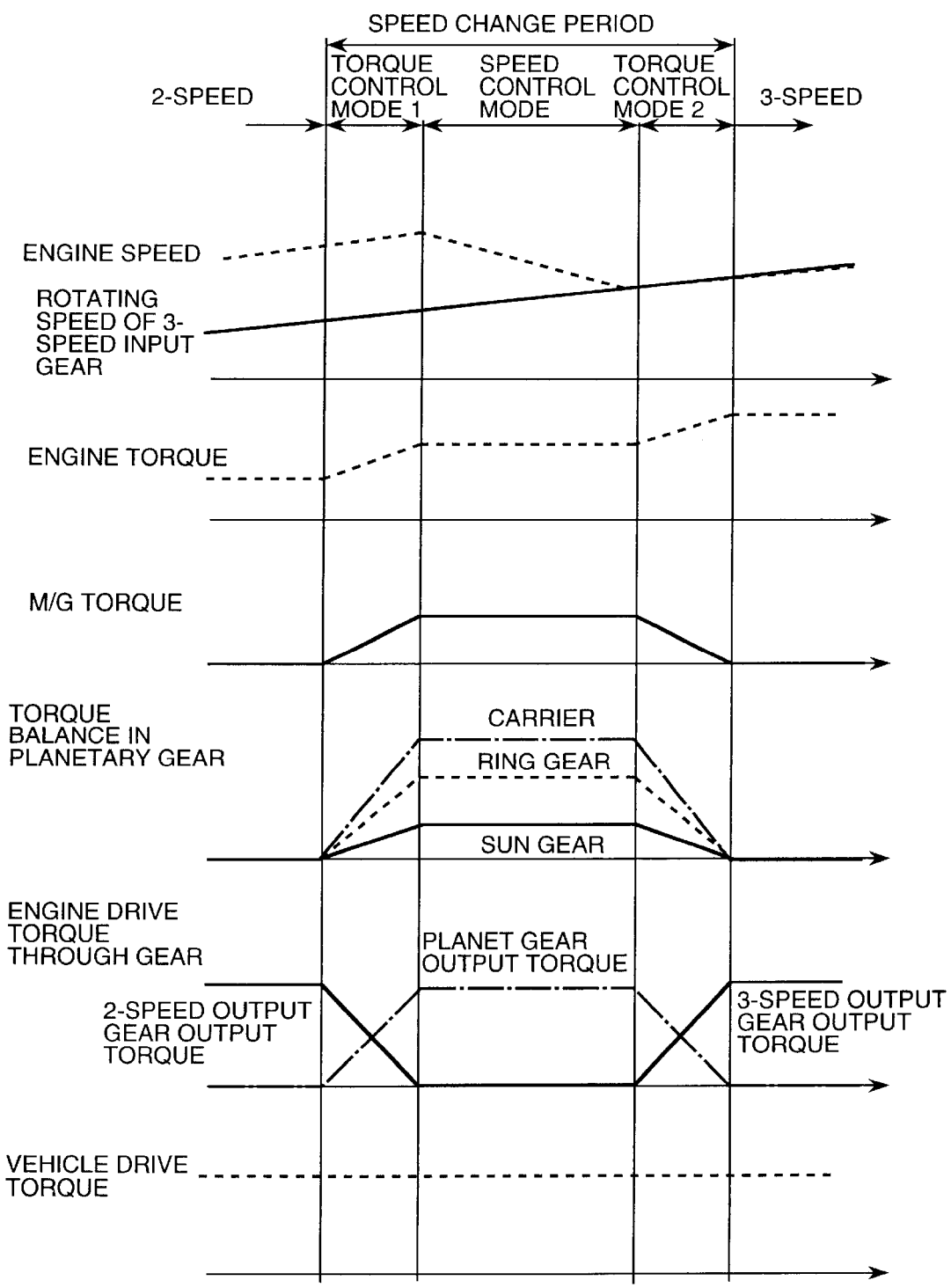
FIG. 12 illustrates the components of the shockless speed change operation in the embodiment of FIG. 9.

FIG. 12 represents the operation of the shockless speed change control in the embodiment shown in FIG. 9, that is, the operation of components at the time of shockless speed change by the harmonized control between the M/G 1030 and the engine 1010. The dog clutch 1035 is engaged with the low speed gear 1033. At this time, the torque of the M/G 1030 is taken as zero, whereby the input and output shafts of the planetary gear 1035 is rotatable, and can be engaged with ease. As a result, no shock occurs when engaged.

First, in the first torque control mode 1, the torque of the M/G 1030 is increased. Thus, the torque generated in the ring gear of the planetary gear is increased, and the driving force of the engine 1010 is introduced into the planetary gear 1035. At this time, the M/G 1030 is subjected to torque control. The 2-speed gear output torque decreases as the torque of the M/G 1030 increases. Therefore, the torque of the engine 1010 is increased to compensate for the vehicle driving force. The engine 1010 is subjected to torque control. When the torque generated in the ring gear becomes equal to the torque of the engine 1010, the dog clutch 1027 engaged with the 2-speed is disengaged. At this time, the torque of the 2-speed gear is about zero, and the dog clutch 1027 is disengaged with ease.

Next, the variable speed change occurs between the 2-speed and the 3-speed. The M/G 1030 is subjected to speed control. The driving force of the engine 1010 is transmitted to the driving shaft 1013 through the planetary gear 1035. When the speed of the engine 1010 coincides with the rotating speed of the 3-speed gear, the mode is a torque control mode in which the dog clutch 1027 is engaged with the 3-speed. Thereafter, the torque of the M/G 1030 is reduced. When the torque of the M/G 1030 is zero, the speed change operation is completed.

Figure 13:
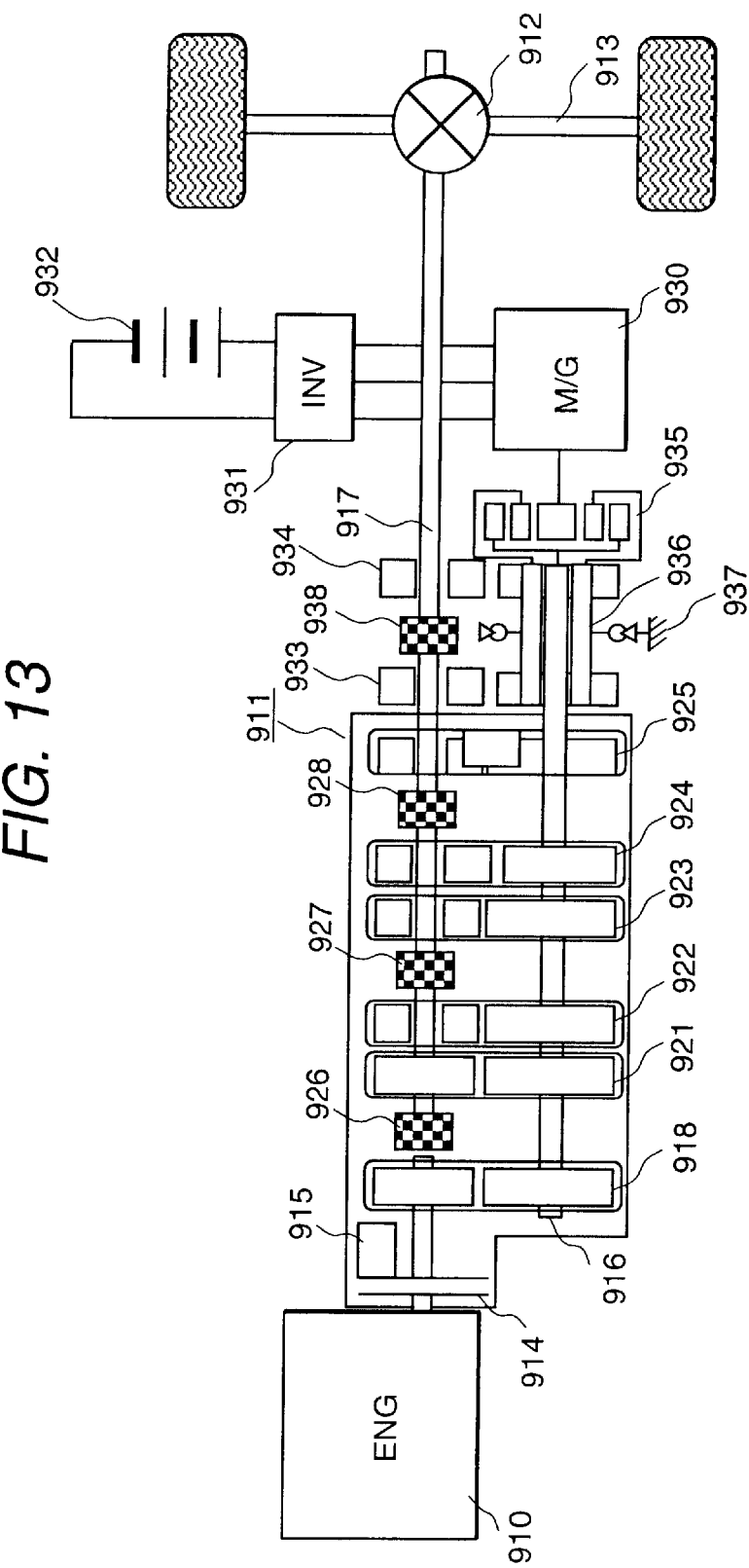
FIG. 13 illustrates a vehicle loaded with a driving apparatus according to another embodiment of the present invention.

FIG. 13 illustrates a vehicle loaded with a driving apparatus according to another embodiment of the present invention. The driving force of an engine 910 is changed in speed by a transmission 911 according to the condition of a vehicle, and transmitted to a driving shaft 913 through a differential gear 912. A clutch 914 is a device for transmitting the driving force of the engine 910 to the transmission 911 or interrupting the same. A clutch actuator 915 is a device for actuating a clutch 914. The transmission 911 is a transmission in which a counter shaft 916 and an output shaft 917 are arranged in parallel, having forward 5 stages and a backward one stage. The driving force of the engine 910 is transmitted to the counter shaft 916 through a speed change stage 918. 1-speed paired gears 921, 2-speed paired gears 922, 3-speed paired gears 923, 5-speed paired gears 924, and backward paired gears 925 include a pair of gears, and a 4-speed is realized by directly connecting a dog clutch 926 to the engine 910. Further, the dog clutch 926 is engaged with the 1-speed paired gears 921 to thereby realize the 1-speed. A dog clutch 927 is engaged with the 2-speed paired gears 922 or the 3-speed paired gears 923 to realize the 2-speed and the 3-speed. A dog clutch 928 is engaged with the 5-speed paired gears 924 or the backward paired gears 925 to realize the 5-speed and the backward. The dog clutches realize engaging and disengaging states under the operation of the shift actuator, though not shown.

M/G 930 is an electric motor, which is driven by an inverter 931. A battery 932 is a power storage device for supplying driving power to the M/G 930 and storing generated power. A planetary gear 935 has input and output shafts of a sun gear, a carrier and a ring gear. The sun gear, the carrier, and the ring gear are connected to the M/G 930, a planetary gear output shaft 936, and the counter shaft 916 of the transmission 911, respectively. On the planetary gear output shaft 936 are arranged two sets of paired gears of low speed paired gears 933, and high speed paired gears 934, which are selectively engaged with the output shaft 917 by a dog clutch 938. A one-way clutch 937 is able to limit a rotating direction of the planetary gear output shaft 936.

Hence, since the gear of the conventional transmission is not used as a transmission channel of output from the planetary gear as in FIG. 1, the gear ratio between the low speed gear 933 and the high speed gear 934 can be designed freely. Further, since a system can be constituted by adding the planetary gear 935 and the M/G 930 to the conventional MT, the system can be reduced in cost.

Figure 14:
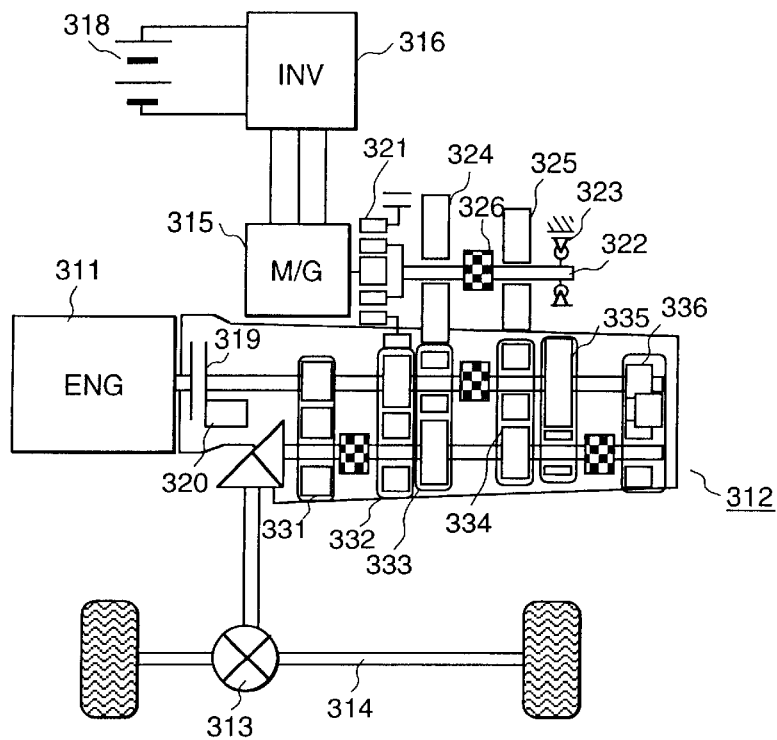
FIG. 14 illustrates a vehicle loaded with a driving apparatus according to another embodiment of the present invention.

FIG. 14 illustrates a vehicle loaded with a driving apparatus according to another embodiment of the present invention. The driving force of an engine 311 is changed in speed by a transmission 312 according to the condition of a vehicle, and is transmitted to a driving shaft 314 through a differential gear 313. The transmission 312 is a transmission in which a shaft on the engine 311 side and a shaft on the driving shaft 314 side are arranged in parallel, having forward 5 stages and a backward one stage. A 1-speed 331, a 2-speed 332, a 5-speed 335, and a backward 336 have, on the shaft on the driving shaft 314 side, a dog clutch for engaging and disengaging the shaft of the transmission 312 with each speed change gear. A 3-speed 333 and a 4-speed 334 have, on the shaft on the engine 311 side, a dog clutch for engaging and disengaging the shaft of the transmission 312 with each speed change gear. The dog clutches realize engaging and disengaging states under the operation of the shift actuator, though not shown.

A clutch 319 is a device for transmitting the driving force of the engine 311 to the transmission 312 or interrupting the same. A clutch actuator 320 is a device for actuating a clutch 319. M/G 315 is an electric motor, which is driven by a driving device 316 of the M/G 315. A battery 318 is a power storage device for supplying driving power to the M/G 315 and storing generated power.

A planetary gear 321 has input and output shafts of a sun gear, a carrier and a ring gear. The sun gear, the carrier and the ring gear are connected to the M/G 315, a planetary gear output shaft 322, and an input gear, arranged on the shaft of the engine 311 side, of the 2-speed 332 of the transmission 312, respectively. On the planetary gear output shaft 322 are arranged a low speed gear 324 meshed with an input gear, arranged on a shaft of the engine 311, of the 3-speed 333 of the transmission 312 and high speed paired gears 325 meshed with an input gear arranged on a shaft of the engine 311 of the 4-speed 334 of the transmission 312. Likewise, the low speed gear 324 and the high speed gear 325 are selectively engaged with and disengaged by a dog clutch 326 on the planetary gear output haft 322. In a case where the torque assist or the like is carried out in the M/G 315, it is possible that a one-way clutch 323 is actuated to amplify a torque by the planetary gear 321 for transmission.

Figure 15:
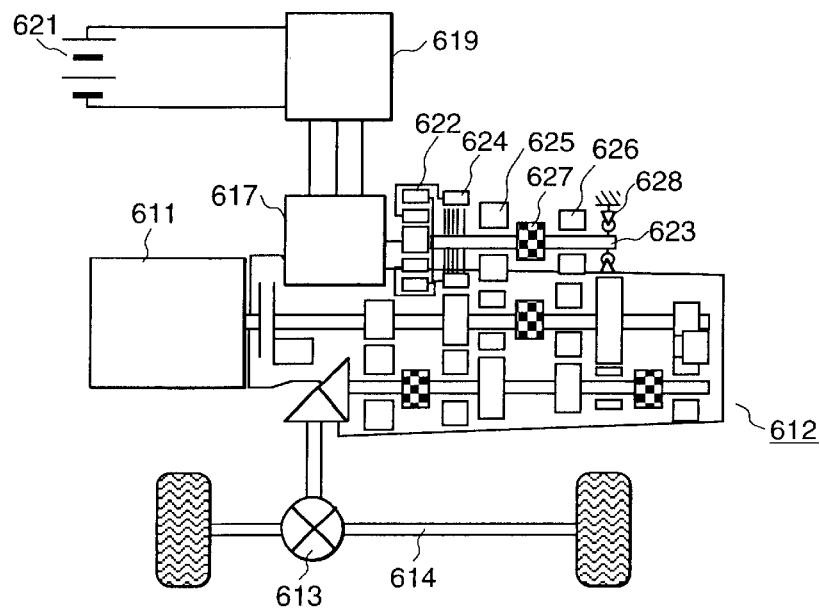
FIG. 15 illustrates a vehicle loaded with a driving apparatus according to another embodiment of the present invention.

FIG. 15 illustrates a vehicle loaded with a driving apparatus according to another embodiment of the present invention. In this embodiment, a multi-plate clutch 624 is disposed on the driving device. At this time, in the input and output shafts of a planetary gear 622, a sun gear, a carrier, and a ring gear are connected to an M/G 617, a 2-speed input gear of a transmission 612, and a planetary gear output shaft 623, respectively. In this constitution, the multi-plate clutch is used to enable shockless speed change up to the 3-speed, and the M/G 617 is used to enable shockless speed change for from the 3-speed to the 5-speed, enabling miniaturizing the M/G 617.

Figure 16:
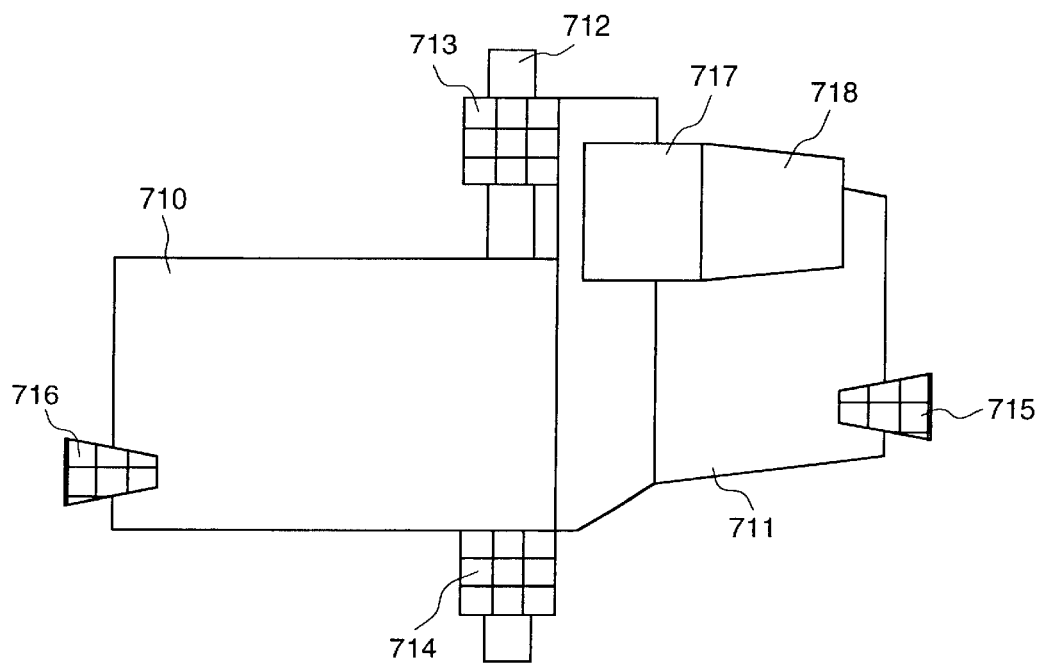
FIG. 16 illustrates a vehicle loaded with a driving apparatus according to another embodiment of the present invention.

FIG. 16 illustrates a vehicle loaded with a driving apparatus according to another embodiment of the present invention. In this embodiment, mount devices 713 and 714 are disposed on a sub-frame 712 in order to load an engine 710 and a transmission 711 on the vehicle, and mount devices 715 and 716 are disposed as a connection with a frame constituting a vehicle body connected by the sub-frame 712. At this time, in a speed change mechanism 718 including an M/G 717 and a planetary gear, the heavy M/G 717 is arranged close to a position of a center of gravity of the engine 710 and the transmission 712. Thus, the driving system is balanced to enable realization of the driving system with less loss.

Figure 17:
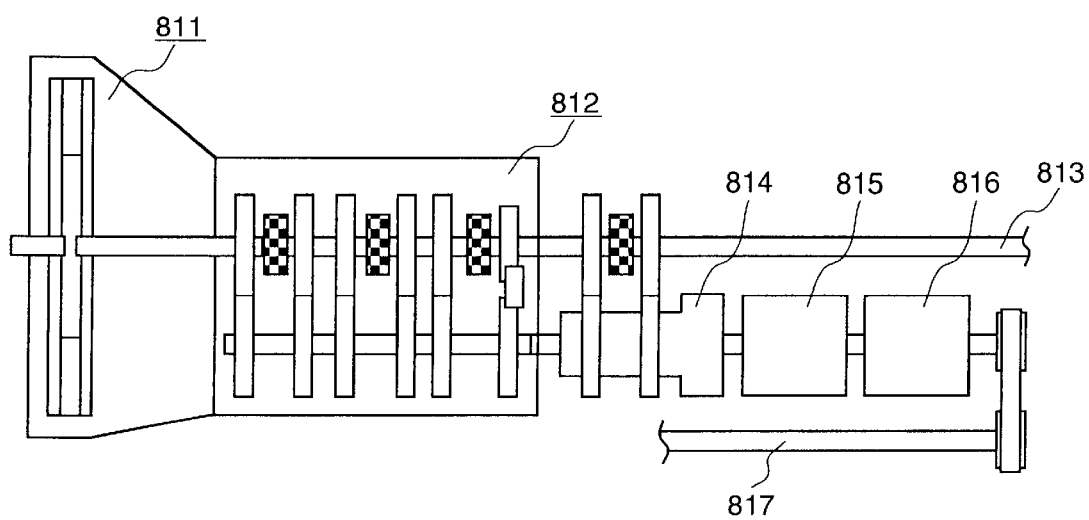
FIG. 17 illustrates a vehicle loaded with a driving apparatus according to another embodiment of the present invention.

FIG. 17 illustrates a vehicle loaded with a driving apparatus according to another embodiment of the present invention. In this embodiment, in 4WD of a rear wheel driving vehicle base, a clutch housing 811 including a clutch, a transmission 812, and an output shaft 813 are arranged in series, and a gear construction 814 including a planetary gear, M/G 815 and M/G 816 are loaded on a transfer case position, whereby the change of the vehicle shape can be suppressed to the minimum. Further, an output shaft of M/G 816 is connected to an existing propeller shaft 817 for front drive wheels to easily provide 4WD.

Hence, according to the present invention, a driving apparatus is provided for continuously controlling the driving force of a vehicle. The torque generated by the motor is small and an electric loss occurring when a current is supplied can be suppressed. Thus, a hybrid vehicle is provided which is low in fuel consumption and has smooth dynamic characteristics. Further, it is possible to provide a driving apparatus and a vehicle using the same which eliminates shock due to torque differences between power transmission channels when changing speed.

In other words, the present invention provides a driving apparatus for a vehicle comprising an engine for providing a primary driving force to a driving shaft and an auxiliary power plant connected with the engine through a transmission. The transmission comprises an input shaft for inputting the primary driving force from the engine and an output shaft connected to the input shaft for transmitting the primary driving force to the driving shaft wherein the auxiliary power plant provides a secondary driving force to the driving shaft during a shifting in speed.

Although the invention has been described above in connection with exemplary embodiments, it is apparent that many modifications and substitutions can be made without departing from the spirit or scope of the invention. Accordingly, the invention is not to be considered as limited by the foregoing description, but is only limited by the scope of the appended claims.

What is claimed as new and desired to be protected by Letters Patent of the United States is:

1. A driving apparatus for a vehicle, comprising:
a transmission having an input shaft to which a driving force of an internal combustion engine is transmitted, and an output shaft to which a driving force of said input shaft is transmitted through a pair of gears and which transmits said driving force to a driving shaft for driving wheels of said vehicle; and
an electric rotary machine for transmitting, when said transmission changes speed, the driving force of said input shaft from said internal combustion engine to said output shaft, wherein said driving force of said input shaft is transmitted to said output shaft without disconnecting the driving force of said internal combustion engine.

2. The driving apparatus of claim 1, wherein said internal combustion engine and said transmission are disposed laterally with respect to a moving direction of said vehicle, in which said input shaft and output shaft are arranged in parallel, said input shaft and said output shaft are each connected to one of three shafts of a planetary gear, said planetary gear is disposed parallel with said input shaft and said output shaft of said transmission.

3. The driving apparatus of claim 2, wherein said electric rotary machine has an output shaft connected to another of the three shafts of said planetary gear.

4. The driving apparatus of claim 3, wherein said electric rotary machine is disposed at a position closer to a position of the center of gravity of a power train comprised of said internal combustion engine and said transmission than to that of said planetary gear.

5. A driving apparatus for a vehicle, comprising:
a transmission having an input shaft to which a driving force of an internal combustion engine is transmitted, and an output shaft to which a driving force of said input shaft is transmitted through a pair of gears and which transmits said driving force to a driving shaft for driving wheels of said vehicle;
wherein when said transmission changes speed, an electric rotary machine is used to transmit the driving force of said input shaft from said internal combustion engine to said output shaft while controlling the speed of said electric rotary machine, wherein said driving force of said input shaft is transmitted to said output shaft without disconnecting the driving force of said internal combustion engine.

6. A driving apparatus for a vehicle, comprising:
an internal combustion engine for driving front wheels;
a first electric rotary machine for driving rear wheels; and
a transmission having an input shaft to which a driving force of said internal combustion engine is transmitted through a clutch, and an output shaft to which the driving force of said input shaft is transmitted through a pair of gears and which transmits said driving force to a driving shaft for said front wheels;
wherein when said transmission changes speed, a second electric rotary machine is used to transmit the driving force of said input shaft from said internal combustion engine to said output shaft, wherein said driving force of said input shaft is transmitted to said output shaft without disconnecting the driving force of said internal combustion engine.

7. A driving apparatus for a vehicle, comprising:
an internal combustion engine for driving front wheels;
a first electric rotary machine for driving rear wheels; and
a transmission having an input shaft to which a driving force of said internal combustion engine is transmitted through a clutch, and an output shaft to which the driving force of said input shaft is transmitted through a pair of gears and which transmits said driving force to a driving shaft for said front wheels;
wherein when said transmission changes speed, a second electric rotary machine is used to transmit the driving force of said input shaft from said internal combustion engine to said output shaft, while controlling the speed of the second electric rotary machine, wherein said driving force of said input shaft is transmitted to said output shaft without disconnecting the driving force of said internal combustion engine.

8. A driving apparatus for a vehicle comprising:
a transmission having a plurality of transmission mechanisms each comprised of a pair of gears on two shafts arranged in parallel, said transmission having an input shaft to which a driving force from an internal combustion engine is input and an output shaft for transmitting a driving force converted by said pair of gears to driving wheels; and
a differential mechanism having three or more transmission shafts;
wherein one of said transmission shafts of said differential mechanism is connected to said input shaft or said output shaft, a first dynamo-electric machine is connected to at least one of the remaining transmission shafts of said differential mechanism, and at least one of said input shaft or said output shaft is connected to another transmission shaft or one of the other transmission shafts of said differential mechanism, said driving force of said input shaft is transmitted from said internal combustion engine to said output shaft, wherein said driving force of said input shaft is transmitted to said output shaft without disconnecting the driving force of said internal combustion engine.

9. The driving apparatus for a vehicle according to claim 8, wherein said transmission has a motor generator connected to the input shaft or the output shaft.

10. The driving apparatus for a vehicle according to claim 8, wherein said differential mechanism comprises a plurality of connecting means connected to said transmission shaft and has switching means for switching said connecting means.

11. The driving apparatus for a vehicle according to claim 8, wherein said differential mechanism has rotary direction limiting means for limiting at least one rotary direction of said input shaft and said output shaft.

12. The driving apparatus for a vehicle of claim 8, wherein said output shaft drives at least one of a plurality of driving shafts of the vehicle, and a motor generator is disposed on at least another of said plurality of driving shafts.

13. A method of driving a vehicle, comprising:
providing an internal combustion engine for driving front wheels, a first auxiliary power plant for driving rear wheels, and a transmission having an input shaft to which a driving force of said internal combustion engine is transmitted through a clutch and an output shaft to which the driving force of said input shaft is transmitted through a pair of gears and which transmits said driving force to the driving shaft of said front wheels;

causing said transmission to change speed; and wherein, during said speed change, a dynamo-electric machine transmits the driving force of said input shaft from said internal combustion engine to said output shaft while controlling the speed of said dynamo-electric machine, wherein said driving force of said input shaft is transmitted to said output shaft without disconnecting the driving force of said internal combustion engine.

14. A method of driving a vehicle, comprising:

providing an internal combustion engine for driving front wheels, an electric rotary machine for driving rear wheels, and a transmission having an input shaft to which a driving force of said internal combustion engine is transmitted through a clutch and an output shaft to which the driving force of said input shaft is transmitted through a pair of gears and which transmits said driving force to the driving shaft of said front wheels; and using said transmission to change speed; and wherein, when said transmission changes speed, a dynamo-electric machine transmits the driving force of said input shaft from said internal combustion engine to said output shaft, while controlling the speed of said dynamo-electric machine and the number of revolutions of said internal combustion engine is brought to a target value, wherein said driving force of said input shaft is transmitted to said output shaft without disconnecting the driving force of said internal combustion engine.

15. A vehicle comprising a driving apparatus which includes:

an internal combustion engine;

a transmission having an input shaft to which a driving force of the internal combustion engine is transmitted;

an output shaft to which a driving force of said input shaft is transmitted through a pair of gears and which transmits said driving force to a driving shaft for driving wheels of said vehicle; and an electric rotary machine for transmitting the driving force of said input shaft from said internal combustion engine to said output shaft when said transmission changes speed, wherein said driving force of said input shaft is transmitted to said output shaft without disconnecting the driving force of said internal combustion engine.

16. A vehicle comprising a driving apparatus which includes:

an internal combustion engine;

a transmission having an input shaft to which the driving force of said input shaft is transmitted;

an output shaft to which a driving force of said input shaft is transmitted through a pair of gears and which transmits said driving force to a driving shaft for driving wheels of said vehicle; and an electric rotary machine for transmitting the driving force of said input shaft from said internal combustion engine to said output shaft when said transmission changes speed, wherein when said transmission changes speed, an electric rotary machine is used to transmit the driving force of said input shaft from said internal combustion engine to said output shaft while controlling the speed of said electric rotary machine, wherein said driving force of said input shaft is transmitted to said output shaft without disconnecting the driving force of said internal combustion engine.

* * * * *